US006942959B2

(12) United States Patent
Dubin et al.

(10) Patent No.: US 6,942,959 B2
(45) Date of Patent: Sep. 13, 2005

(54) DISPLAY SCREEN AND METHOD OF MANUFACTURE THEREFOR

(75) Inventors: Matthew B. Dubin, Phoenix, AZ (US); Brent D. Larson, Cave Creek, AZ (US)

(73) Assignee: Honeywell Inc., Minneapolis, MN (US)

( * ) Notice: Subject to any disclaimer, the term of this patent is extended or adjusted under 35 U.S.C. 154(b) by 188 days.

(21) Appl. No.: 10/264,995

(22) Filed: Oct. 4, 2002

(65) Prior Publication Data

US 2003/0107802 A1 Jun. 12, 2003

Related U.S. Application Data

(62) Division of application No. 09/283,884, filed on Apr. 1, 1999, now Pat. No. 6,469,830.

(51) Int. Cl.[7] .............................................. G03B 21/56
(52) U.S. Cl. ...................................................... 430/321
(58) Field of Search .......................... 430/321; 359/454, 359/455, 456, 449

(56) References Cited

U.S. PATENT DOCUMENTS

| | | | |
|---|---|---|---|
| 2,180,113 A | 11/1939 | Land et al. | |
| 2,338,654 A | * 1/1944 | Macneille | ................... 359/456 |
| 2,371,172 A | 3/1945 | Hotchner | |
| 2,378,252 A | 6/1945 | Stachle et al. | |
| 3,552,822 A | 1/1971 | Altman | |
| 4,165,154 A | 8/1979 | Takahashi | |
| 4,490,010 A | 12/1984 | Honda et al. | |
| 4,502,755 A | 3/1985 | Mori et al. | |
| 5,066,099 A | 11/1991 | Yoshida et al. | |
| 5,196,960 A | 3/1993 | Matsuzaki et al. | |
| 5,206,760 A | 4/1993 | Nakashima et al. | |
| 5,231,481 A | 7/1993 | Eouzan et al. | |
| 5,317,449 A | 5/1994 | Furuno et al. | |
| 5,434,706 A | 7/1995 | Mitani et al. | |
| 5,457,572 A | 10/1995 | Ishii et al. | |
| 5,563,738 A | 10/1996 | Vance | |
| 5,615,045 A | 3/1997 | Takuma et al. | |
| 5,626,410 A | 5/1997 | Chambers et al. | |
| 5,661,600 A | 8/1997 | Mitani et al. | |
| 5,666,176 A | * 9/1997 | Kurematsu | ................... 349/95 |
| 5,724,188 A | 3/1998 | Kumagai et al. | |
| 5,758,940 A | 6/1998 | Ogino et al. | |
| 5,760,955 A | 6/1998 | Goldenberg et al. | |
| 5,768,014 A | 6/1998 | Lee | |
| 5,771,066 A | 6/1998 | Barnea | |
| 5,815,313 A | 9/1998 | Mitani et al. | |
| 5,824,174 A | 10/1998 | Mitani et al. | |
| 5,914,809 A | 6/1999 | Mitani et al. | |
| 6,278,546 B1 | 8/2001 | Dubin et al. | |

FOREIGN PATENT DOCUMENTS

| | | |
|---|---|---|
| EP | 0 656 555 A1 | 6/1995 |
| EP | 0 671 653 A1 | 9/1995 |
| EP | 0 753 790 A1 | 1/1997 |
| EP | 0 905 556 A2 | 3/1999 |
| JP | 10-039769 A * | 2/1998 |

OTHER PUBLICATIONS

Hurley and Stevens Formation of Integral Images By Afocal Paris of Lens Arrays (Super Lenses) p147, IOP Short Meetings No. 30, May 1, 1992.

* cited by examiner

*Primary Examiner*—John A. McPherson

(57) ABSTRACT

A screen assembly that combines an angle re-distributing prescreen with a conventional diffusion screen. The prescreen minimizes or eliminates the sensitivity of the screen assembly to projector location. The diffusion screen provides other desirable screen characteristics. Compatible screen structures, along with methods for fabricating high resolution prescreens and methods and devices for maintaining the desired relationship between the prescreen and the diffusion screen are contemplated.

9 Claims, 15 Drawing Sheets

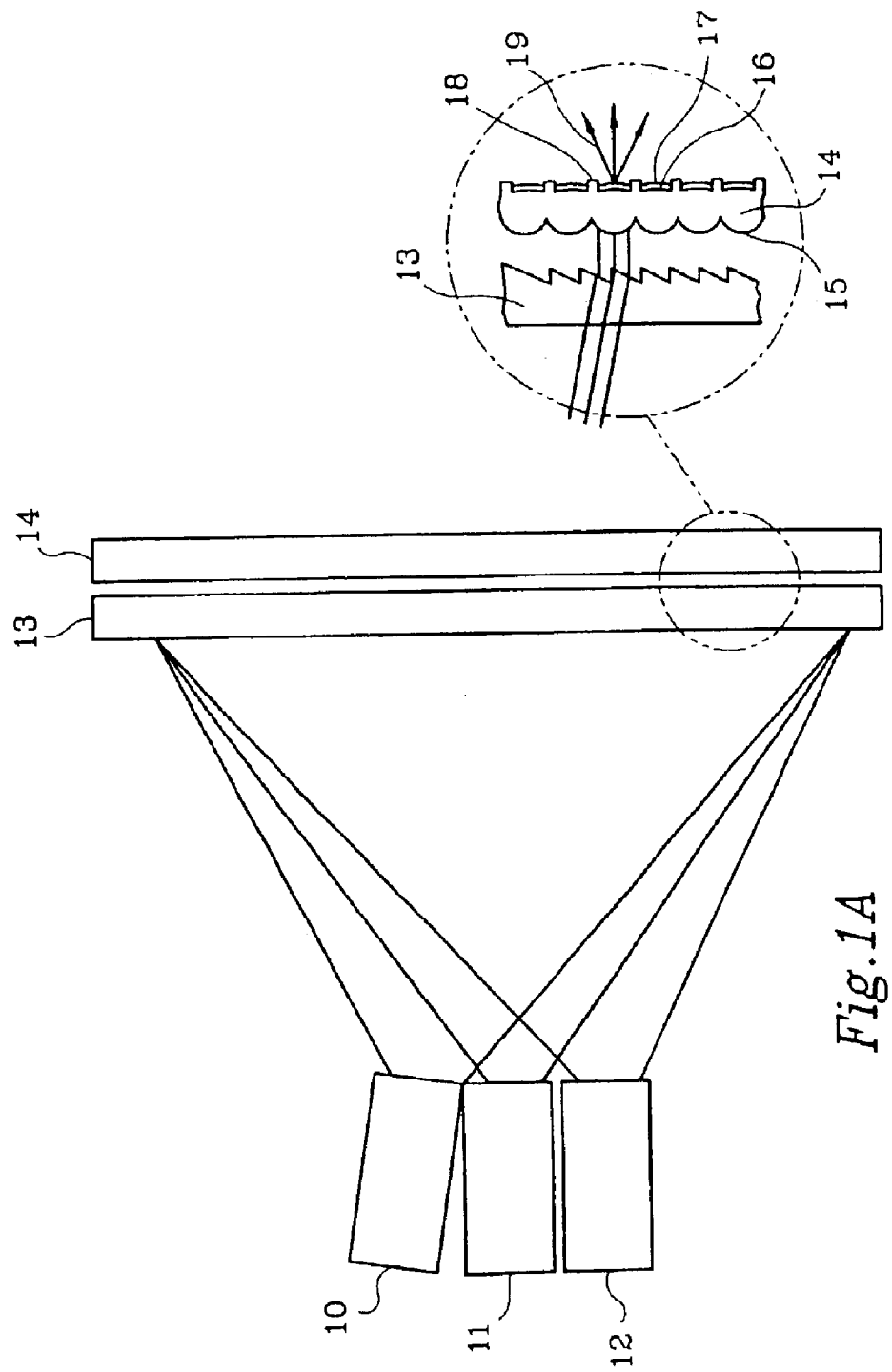

SIDE VIEW

DISPLAY SCREEN AND METHOD OF MANUFACTURE THEREFOR

CROSS REFERENCE TO RELATED APPLICATION

This application is a divisional of U.S. patent application Ser. No. 09/283,884 filed on Apr. 1, 1999 now U.S. Pat. No. 6,469,830.

The present application is related to U.S. patent application Ser. No. 09/283,173, filed Apr. 1, 1999, entitled "DISPLAY SCREEN AND METHOD OF MANUFACTURE THEREFOR", U.S. patent application Ser. No. 09/159,340, filed Sep. 23, 1998, entitled "METHOD AND APPARATUS FOR PROVIDING A SEAMLESS TILED DISPLAY"; U.S. patent application Ser. No. 09/159,024, filed Sep. 23, 1998, entitled "METHOD AND APPARATUS FOR CALIBRATING A DISPLAY USING AN ARRAY OF CAMERAS"; and U.S. patent application Ser. No. 09/158,995, filed Sep. 23, 1998, entitled "METHOD AND APPARATUS FOR CALIBRATING A TILED DISPLAY", all of which are assigned to the assignee of the present invention and incorporated herein by reference.

BACKGROUND OF THE INVENTION

This invention relates to display screens, and more particularly, to projection. display screens for rear projection displays, front projection displays and tiled projection displays.

The performance and flexibility of projection displays has increased dramatically in recent years. This has produced dramatic growth in the use of projection displays in an ever increasing number of applications. In addition to film based systems, significant advances have been made in the electro-optic technologies for image generation. These technologies include Cathode Ray Tubes (CRTs), Liquid Crystal Displays (LCDs), electro-mechanical light modulators and numerous other light modulation technologies. To support and complement these advances, screen technology has also advanced.

In its most basic form, a projection display screen may include a light scattering element, or diffuser. The screen may be reflective, in the case of a front projection display, or transmissive in the case of a rear projection display. Numerous variations of light scattering elements have been developed, including volume scatterers, surface scatterers, holographic diffusers, beads, lenticular elements and the like.

While a diffuser can serve the basic function of a projection screen, additional features are often desirable in selected applications. For example, structures that suppress the reflection of ambient light are often incorporated into projection screens. Controlled scattering angles have also been used to maximize the luminance of the viewable light within a range of viewing angles. Uniformity enhancing mechanisms such as Fresnel lenses have also been placed behind or incorporated into the back of rear projection screens.

An illustrative prior art projection system is shown in FIGS. 1A–1B. As shown, a red CRT projector 10, a green CRT projector 11 and a blue CRT projector 12 together project a full color image. The image is focused in the proximity of projection screen 14. Before the light reaches projection screen 14, the light rays are redirected by Fresnel lens 13 to impinge on screen 14 at substantially a normal angle of incidence. As shown in FIG. 1B, screen 14 may be a dual lenticular structure having a rear and front lenticular surface 15 and 16, respectively. The rear lenticular surface 15 approximately focuses the light onto the front lenticular surface 16, in the region between black stripes 18. Black stripes 18 absorb a substantial portion of the incident ambient light, thereby increasing the contrast of the screen. To complete the screen and control the effective scattering profile, diffusers 17 are incorporated into or onto the screen. In the example shown, the additional diffusers determine the degree of scattering in the vertical axis along the direction of the lenslets.

The two lenticular surfaces 15 and 16 function to provide a controlled amount of scatter in the direction normal to the lenticular axes. The lenticular surfaces 15 and 16 may also compensate for the relative offset between the red, green and blue projectors to minimize color shifts as a function of viewing angle.

U.S. Pat. No. 5,434,706 to Matani et al.; U.S. Pat. No. 5,196,960 to Matsuzaki et al.; U.S. Pat. No. 5,457,572 to Ishii et al.; and U.S. Pat. No. 5,724,188 to Kumagai et al. disclose variations on this basic approach. These schemes tend to work well for relatively low resolution applications, such as projection television applications using formats such as NTSC. At higher resolutions, however, the prior art approaches can become obtrusive and can limit the useful resolution of the display. For example. U.S. Pat. No. 5,724,188 to Kumagai et al. discusses some of the difficulties in manufacturing suitable screens for high resolution, including difficulties in making thin screen elements, maintaining rigidity and maintaining contrast.

The difficulties associated with prior art screen technologies, both diffusely scattering and lenticular, become increasingly problematic when the resolution is further increased by providing a number of tiled projectors. In a tiled display, an additional source of non-uniformity is introduced. As illustrated in FIG. 2A, the luminance uniformity of a tiled display is typically a function of viewing angle. More specifically, FIG. 2A shows two non-overlapped projectors 20 and 21 projecting light onto a screen 29. Several resulting scattering profiles 22 through 26 are also shown. Profiles 22 and 26 show how light incident normal to screen 29 is scattered. As the incident light becomes more off-axis, however, profiles such as 23 and 25 result. At the seam, which is the point where the two sets of projected rays meet, a profile such as profile 24 is obtained.

FIG. 2B shows two different observation reference points 27 and 28. From the various profiles, it is clear that the luminance image observed across the screen from reference point 27 is in general different from that observed from reference 28 (i.e. looking at the screen from a different angle). This effect can be reduced by overlapping the images of adjacent projectors, as more fully described in a co-pending U.S. patent application Ser. No. 09/159,340, entitled "METHOD AND APPARATUS FOR PROVIDING A SEAMLESS TILED DISPLAY", which is incorporated herein by reference. Providing overlap can also aid in other subjective measures of perceived seamlessness, such as color uniformity and vernier mismatch between tiles. Therefore, the ability for a projection screen to support overlap is highly desirable.

Many prior art screens cannot readily support overlap in tiled displays. For example, in a prior art Fresnel field lens approach, little or no overlap is allowed because each projector must typically have a distinct Fresnel lens. The Fresnel lens simply cannot compensate for light emanating from different spaced locations. Because little or no overlap is allowed, the projected image from each projector must typically be precisely matched in size and location with the corresponding Fresnel lens to minimize the visible seams. This greatly impacts the alignment tolerance and stability of the resulting system. Further, it may be difficult to mask slight variations in luminance or color coming from adjacent projectors.

Still further constraints are often placed on high resolution systems. Numerous artifacts such as Moire patterns can result when the screen features interfere with the Fresnel pitch or the projected image pitch. Pixel substructure may be visible in some or all regions of the screen, luminance efficiency may be of high importance and ambient light conditions may be extreme. All of these can lead to significant tradeoffs when working within the framework of prior art screen approaches.

SUMMARY OF THE INVENTION

The present invention overcomes many of the disadvantages of the prior art by providing an angle re-distributing prescreen that minimizes or eliminates the screen sensitivity to projector location, in conjunction with a screen preferably having established screen characteristics such as diffusion characteristics. Compatible screen structures are contemplated, along with methods for fabricating the prescreen and maintaining the desired relationship between the prescreen and the screen.

The use of an angle re-distributing prescreen to act as a position-independent field lens combined with a separate screen provides a number of advantages over the prior art. For example, the angle re-distributing nature of the prescreen can de-couple the characteristics related to projector location from other screen characteristics. This allows the screen characteristics to be selected on the basis of ambient light performance, light distribution, or other performance considerations important in the target application. Furthermore, when the prescreen is used with a conventional screen such as a conventional diffusion screen, the cost of the screen assembly may be reduced, and the scalability of the screen may be improved.

In one illustrative embodiment, the display screen includes a lenticular lens array disposed adjacent to an incidence side of a screen, and a diffusion screen disposed adjacent to an emission side of the screen. The diffusion screen may or may not be separated from the lenticular lens array.

To secure the lenticular lens array to the diffusion screen, an edge clamping assembly may be provided. The edge clamping assembly may clamp the edges of the diffusion screen to the lenticular lens array. To maintain a gap between the lenticular lens array and the diffusion screen, one or more edge spacers may be inserted between the lenticular lens array and the diffusion screen. In some embodiments, the edge clamping assembly may apply lateral tension to the lenticular lens array and/or diffusion screen, to provide a more uniform spacing between the lenticular lens array and the diffusion screen.

Rather than using an edge clamping assembly, it is contemplated that the lenticular lens array may be spot bonded to the diffusion screen at predetermined bonding locations. A gap may be maintained, if desired, except at the predetermined bonding locations. It is contemplated that spot bonding may be used in lieu of, or in addition to, the edge clamping assembly discussed above.

Preferably, the lenticular lens array is formed on a first substrate, and the diffusion screen is formed on a second substrate. The first substrate and the second substrate may or may not be separated by a gap. To secure the lenticular lens array to the diffusion screen, a third substrate may be provided. The lenticular lens array may then be sandwiched between the third substrate and the diffusion screen.

The lenticular lens array may also be secured to the diffusion screen using a sealing mechanism. The sealing mechanism may provide a seal around the edges of the lenticular lens array and the diffusion screen, leaving a sealed space therebetween. By applying a negative pressure to the sealed space, the lenticular lens array may be held in place relative to the diffusion screen. Other methods for holding the lenticular lens array in close proximity to the diffusion screen include using an electrostatic force or the like.

It is contemplated that the lenticular lens array may include single or dual sided lenticular lenslets, single or dual sided refractive Fresnel lenslets, Gradient Refractive Index (GRIN) lenslets, holographic lenslets having one or more holographic layers, cylindrical lenslets, or any other type of lenslets. Furthermore, it is contemplated that some of the lenslets in the array of lenslets may be different from others. For example, it is contemplated that the shape and/or size of selected lenslets may be different from the shape and/or size of other lenslets in the array.

As indicated above, the screen assembly of the present invention may be used in conjunction with a tiled projection display. A tiled projection display typically includes two or more projectors, each projecting an image onto a screen. Often, the images of adjacent projectors overlap one another on the incidence side of the screen. The screen assembly of the present invention preferably includes an array of lenslets disposed adjacent to the incidence side of the screen, and a diffusion screen disposed adjacent the emission side of the screen. Configured in this way, the array of lenslets in the prescreen may redirect the incident light from each of the projectors toward the diffusion screen.

In some applications, it may be desirable to restrict the spatial extent of the incoming light to a predetermined range for each lenslet. To accomplish this, an array of light apertures are provided. For example, in one illustrative embodiment, an array of lenslets is provided on one side of a substrate, and an array of light apertures is provided on the opposing side of the substrate. The array of apertures are in registration with the array of lenslets. The apertures function to provide an output which is angularly balanced.

A number of methods for fabricating high resolution display screens are also contemplated. In one illustrative method, a registered dual lenticular prescreen is provided. This method includes the steps of: (1) providing a first roller having a first pattern on a surface thereof for providing a first lenticular pattern on a first side of the prescreen; (2) providing a second roller having a second pattern on a surface thereof for providing a second lenticular pattern on a second side of the prescreen; (3) feeding a deformable material between the first roller and the second roller; (4) turning the first and second rollers in opposite directions to advance the deformable material; and (5) maintaining the registration of the first roller with respect to the second roller so that the first pattern and the second pattern remain in registration with each other.

It is contemplated that the first roller and the second roller may be heated to a predetermined temperature. Preferably, the first roller and the second roller are kept at the predetermined temperature by actively heating and/or cooling the rollers, ideally by using a feedback system. By maintaining a relatively constant temperature, the expansion and contraction of the rollers may be reduced. In one example, the temperature of the rollers may be controlled by providing electric heat, or selectively circulating heated fluid through the rollers. Finally, it is recognized that by only providing a pattern on one of the rollers, a single sided lenticular prescreen may be formed.

Another illustrative method for forming a registered dual lenticular prescreen includes the steps of: (1) providing a first mold having a first pattern on a surface thereof for providing a first lenticular pattern on a first side of the prescreen; (2) providing a second mold having a second pattern on a surface thereof for providing a second lenticular pattern on a second side of the prescreen, wherein the first mold is spaced from the second mold; (3) moving a deformable material into the space between the first mold and the second mold; (4) moving the first mold and the second mold toward one another to emboss or otherwise deform the deformable material with the first pattern on the first side of the prescreen and the second pattern on the second side of the prescreen; (5) moving the first mold and the second mold away from one another; (6) moving the deformable material in a predetermined direction; and (7) moving the first mold and the second mold toward one another to emboss or otherwise deform the deformable material with the first pattern on the first side of the prescreen and the second pattern on the second side of the prescreen.

To align the molds with previously formed lenticular lenslets, it is contemplated that the deformable material may be moved until a previously formed lenslet is detected by a detection system, such as an optical detection system. It is contemplated that the deformable material may be moved in either an X-direction, a Y-direction, or both. Finally, it is recognized that by only providing a pattern in one of the molds, a single sided lenticular prescreen may be formed.

In another illustrative method, an array of optical apertures is formed using an array of preformed lenslets. This method includes the steps of: (1) providing a photosensitive material adjacent the array of lenslets; (2) providing incident light to at least a portion of the array of lenslets, wherein the array of lenslets direct the light toward the photosensitive material; and (3) developing the photosensitive material and removing or otherwise processing selected portions of the photosensitive material to form the array of optical apertures. Preferably, only the photosensitive material that was exposed to light is removed. The photosensitive material may be a photo-resist, a silver-halide emulsion, or any other photosensitive material.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 1A is a schematic diagram of a prior art projection system;

FIG. 1B is an enlarged cross-sectional view of the screen assembly of FIG. 1A;

DETAILED DESCRIPTION OF THE PREFERRED EMBODIMENTS

The present invention provides an angle re-distributing prescreen that minimizes or eliminates the screen sensitivity to projector location, in conjunction with a screen having established screen characteristics. Compatible screen structures are contemplated, along with methods for fabricating the prescreen and maintaining the desired relationship between the prescreen and the screen.

Figure 2A:
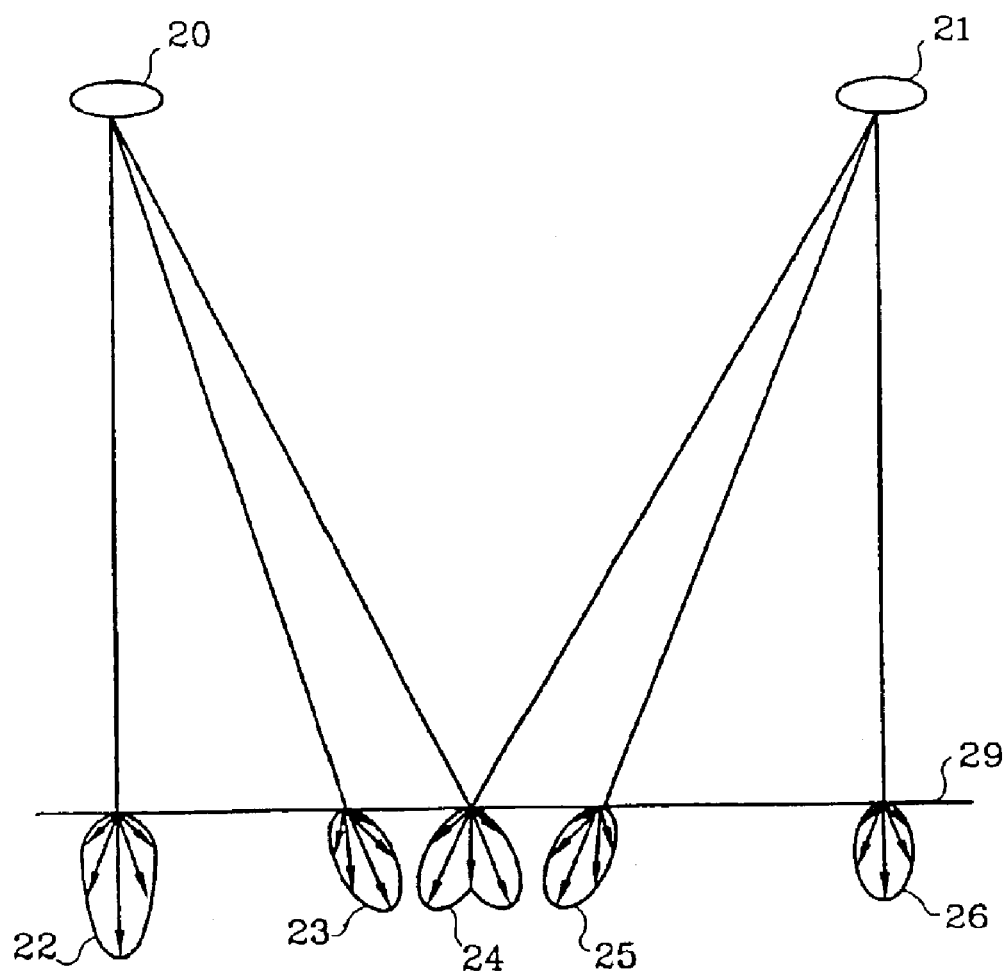
FIG. 2A is a schematic diagram showing the angular distribution of light rays from two non-overlapped projectors projecting light onto a screen.
Figure 2B:
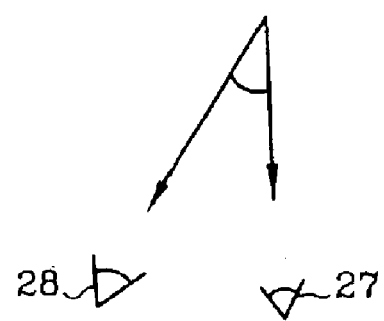
FIG. 2B is a schematic diagram shown two different observation reference points.
Figure 3:
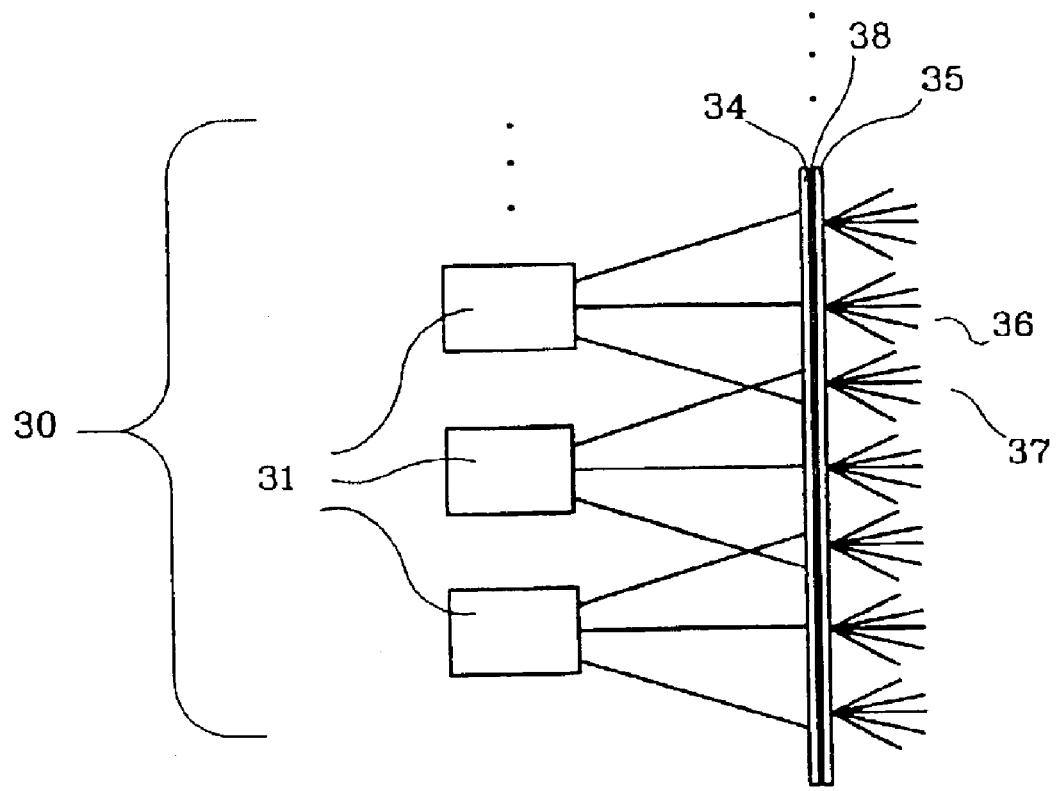
FIG. 3 is a schematic diagram showing an illustrative display of the present invention.

FIG. 3 is a schematic diagram showing an illustrative display system 30 in accordance with the present invention. At the core of the system 30 are one or more projection display modules 31. Each display module 31 includes one or more light modulating devices, such as active matrix liquid crystal displays (AMLCDs), digital micromirror devices (DMDs) or similar devices known in the art, as well as drive electronics and a light source. Each display module 31 also includes projection optics which project an image produced at the light modulating device onto the projection screen 35. In one embodiment, projection screen 35 is selected from a variety of conventional projection screen formats. In its most basic form, projection screen 35 is a relatively thin light diffusing layer, possibly supported by a rigid, light transmitting support substrate.

To provide a high level of uniformity in the output image without imparting undue size, complexity or cost, prescreen 34 is provided. Prescreen 34 is an angle re-directing element which, while proximate to the diffusing layer of screen 35, may be formed on a separate substrate. A function of prescreen 34 is to yield an angular distribution of light rays impinging on the screen 35 that have a substantially reduced dependence on the location of the source projector 31 relative to the screen location.

In the absence of prescreen 34, the angular distribution of light rays 36 in the center of a particular projected image from projector 31 takes on a particular form. For most conventional screens 35, the rays 36 are centered in angular direction around the incident direction from projector 31, which is normal to the screen in the case of light rays 36. For most conventional projection screens 35, the light rays 37, at the edge of a projected image from projector 31, are on average somewhat off-axis. This results in a variation of relative luminances between sets of rays 36 and 37 as the position of an observer or viewer changes.

An effect of prescreen 34 is to redirect the light prior to its reaching screen 35, such that the angular distributions of sets of rays 36 and 37 are substantially equal, and in the embodiment shown are centered on the normal to the screen 35. Furthermore, prescreen 34 may accomplish this for a range of projector locations for each location on screen 35.

To maintain uniformity in a multiple projector, or tiled, display system, it is often desirable to correct for regions of the displayed image on screen 35 that are in the boundary region, or seam, between projected images. One method for minimizing the variation across the seam is to overlap the images. This is shown in FIG. 3 as regions on screen 35 in and around light rays 37 where the screen receives light rays from more than one projector. The prescreen 34 of the present invention may allow angular distributions from the screen 35 to be relatively independent of the overlap, thereby allowing more effective use of the degree of overlap as a design parameter to minimize the visibility of seams.

The spatial relationship between the prescreen 34 and screen 35 may be held constant by proximity maintaining assembly 38. Proximity maintaining assembly 38 may satisfy several conditions, depending on the target application. First, the functionality of the prescreen and screen elements must not be compromised, at least when the prescreen 34 includes surface relief structures facing the screen. Second, since the prescreen causes bending and some predictable spreading of the projected light rays, the separation between the prescreen 34 and the screen 35 should be kept small to preserve system resolution. Third, the separation between the prescreen 34 and the screen 35 should be sufficiently uniform such that resolution capability due to the separation does not vary to a visually objectionable degree across the displayed image area. Finally, for those applications where depixelization of the projected image is desirable, the nominal separation between the prescreen 34 and the screen 35 may be increased.

Figure 4A:
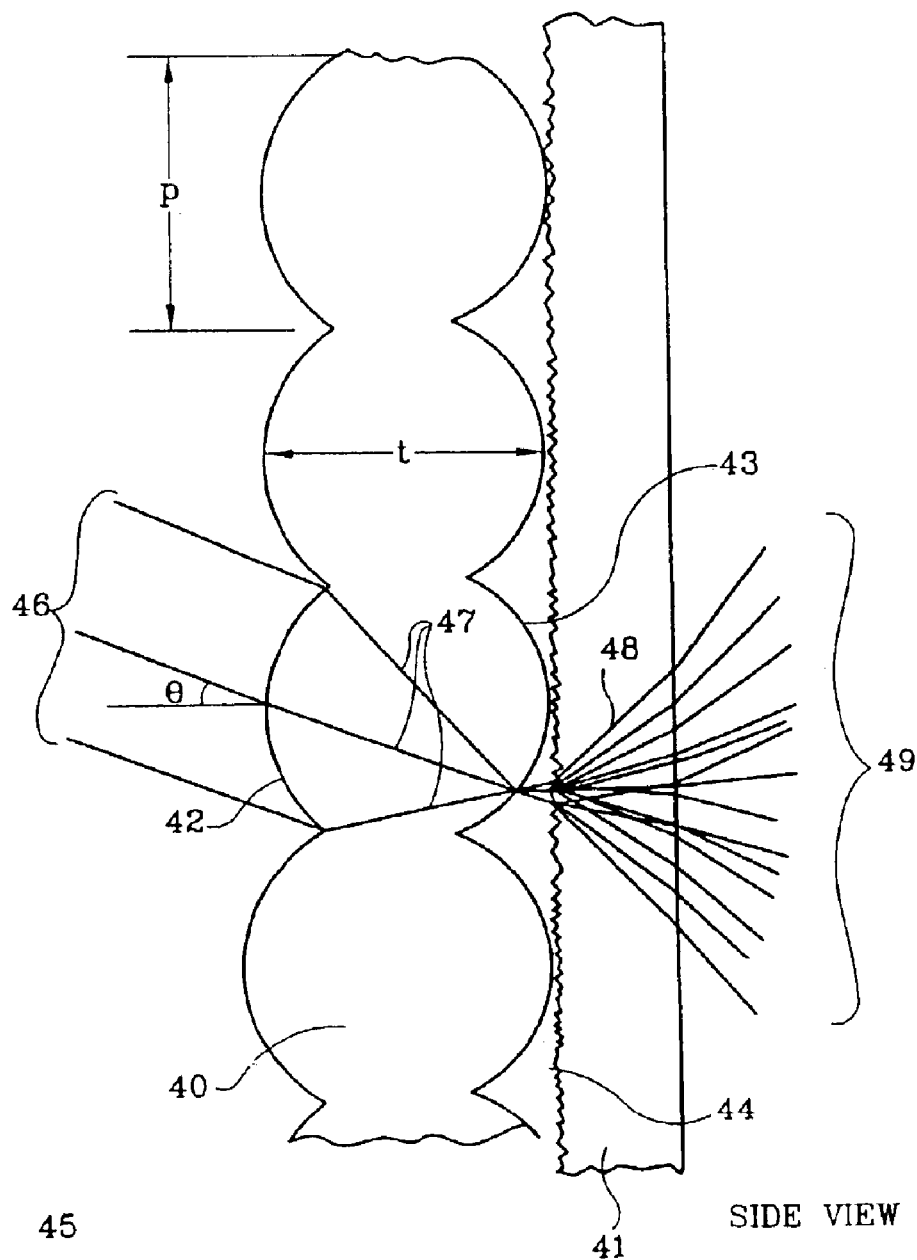
FIG. 4A is an enlarged cross-sectional side view of an illustrative screen assembly in accordance with the present invention.
Figure 4B:
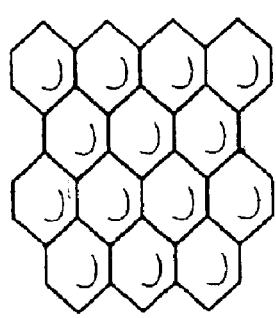
FIG. 4B is a partial rear view of the illustrative screen assembly of FIG. 4A.

FIG. 4A is an enlarged cross-sectional side view of an illustrative screen assembly in accordance with the present invention. Prescreen 40 includes a thin, transparent dual lenticular array structure, as shown. Suitable materials include, but are not limited to polycarbonate, acetate, vinyl, polyester, acrylic, TAC, PET and other polymer films. Each lenslet in the lenticular array has a rear surface 42 closest to the projectors, and a front surface 43 proximate the screen 41. In the embodiment shown, the lenslets are arranged in a hexagonal packed pattern 45, as shown in FIG. 4B, although the array could be square, rectangular, linear (cylindrical lenses), pseudo-random or otherwise arranged.

In operation, light rays 46 from a projector impinge upon each lenslet at an angle of incidence which varies with the relative positions of the projector and the lenslet. The light rays 47 inside the prescreen are directed from the input face 42 to the corresponding and aligned front face 43. Lens face 43 may function significantly as a telecentric lens with surface 42, the aperture stop for the pair 42 and 43, at its focal, or Fourier plane, i.e., with a focal length approximating the film thickness "t" in the transparent medium refractive index "n" of the film.

Upon exiting the prescreen 40, the light rays emerge centered approximately on the normal to the screen 41. Screen 41 may in general be a diffusing screen, either conventional or unconventional. In the present embodiment, screen 41 includes a substrate having a thin scattering layer 44 adjacent to the prescreen 40. Upon exiting the scattering layer 44, the light rays 48 are further diffused in angle, but retain their approximately normal orientation relative to the screen 41. The exiting rays 49 are then intended for viewing, and have an orientation profile which is largely independent of the angle of the original incident rays 46.

Because lens 42 is located at the Fourier plane of lens 43, the shape of lens 42 is converted from spatial information to angular information. Depending on the shape of the lens 42, the angular distributions can be made wider in some directions that others. For instance, a rectangular lens results in a distribution that is approximately centered on the normal, but it will be wider in one direction than the other. If the screen used with such a prescreen has reasonably high gain, then there will be an asymmetric viewing cone. If the aspect ratio is changed and the pitch is not, some blocking materials must be used. This means that efficiency is traded for viewing cone asymmetry. If the pitch is changed with the aspect ratio, then acceptance angle is traded for viewing cone asymmetry.

To preserve image detail in the projected image, the pitch "P" of the lenticular array prescreen 40 should be less than, and preferably substantially less than, the pixel pitch or minimum feature size of the projected image. By setting the pitch "P" to approximately one-third or less of the pixel pitch, it is possible to ensure that while adjacent pixels can be slightly blurred together at their boundaries, no mixing of non-adjacent pixels can occur.

Also, in some applications, it may be important to prevent light rays 47 from crossing over into adjacent lenslets. That is, there may be a range of acceptable input acceptance angles θ. The maximum acceptance angle $\theta_{max}$ for the embodiment of FIG. 4A is a function of the radius of curvature of lens face 42 as well as the refractive index "n", pitch "P" and thickness "t" of the transparent prescreen film. For example, a flat rear surface 42 would result in a $\theta_{max}$ of zero, since some portion of any non-normal rays 46 would cross into adjacent lenslets. In the embodiment shown, the rays 47 are shown converging at a point on the front surface 43, but this is not required for effective operation. Hence, the curvatures of the two faces 42 and 43 need not be the same.

The maximum acceptance angle is set such that rays entering through lens 42 will exit through lens 43 and not one of its neighbors. Given the parameters of any system. $_{max}$ can be found. If some simple approximations are made, the relationship is:

$$\max = \frac{d_2 - d_1}{2} + \frac{d_1}{2f_1}$$

Where $d_2$ is the diameter of the lens 43, $d_1$ is the diameter of lens 42, is the thickness divided by the index of refraction. and $f_1$ is the focal length of lens 42. For reasonable systems, $_{max}$ will be greater than zero.

In many cases, $d_1$ is approximately equal to $d_2$, and $f_1$ is approximately equal to This means that $_{max}$ is strongly dependent upon the ratio of the diameter of the lens to the thickness. The result is that good angular acceptance and resolution are achieved when the pitch "p" and the thickness "t" are approximately equal. Therefore, to be useful for high resolution imagery, the thickness should be less than, and preferably substantially less than the pixel pitch of the projected image. Again, a factor of one-third the pixel pitch or minimum feature size of the projected image is preferred.

In some applications, a key to the operation of the screen assembly is the separation of the dual-lenslet structure 40 from the diffusing screen 41. This allows full flexibility on the useful set of screen candidates to substitute for screen 41, including for example, prior art lenticular screens such as element 14 in FIG. 1. In this case, the prescreen 40 provides considerable benefits for scalability and tiling relative to the corresponding Fresnel lens angular compensation mechanism 13 from FIG. 1.

Prescreen 40 is preferably separated from screen 41 by an air gap, since this maximizes the refractive power of surface 43 for a given curvature. Contact at the highest lens points is acceptable in many applications, as is shown in FIG. 4. Direct lamination is also contemplated, especially if a suitably low index adhesive is used. One penalty of lamination is that the acceptance angle may be reduced due to a larger thickness "t" for a given curvature of surface 43.

It is possible to further define the necessary thickness for a generally useful high resolution prescreen. A typical range of pixel pitches for high resolution displays and printed material at normal viewing distances is 100 to 300 ppi (pixels per inch). This can be understood by the following example. Typical visual acuity begins to fail in the vicinity of about 30 cycles per degree, as established by both empirical studies as well as diffraction analysis of the optics of the human eye. Assuming a viewing distance of around 18", or approximately 0.31 inches per degree, the acuity limit is around 95 cycles per inch. Thus, in order to not visualize objectionable pixel substructure, the pixel density should be greater than 95 pixels per inch. Higher pixel densities are still helpful. though, since even at the Nyquist scenario using 2 pixels per cycle, the acuity limit is around 190 pixels per inch, and resolutions up to 300 ppi allow for reduced aliasing as well as closer viewing distances. Assuming 100–300 ppi, and a range of 1–3 lenslets/pixel, the target pitch of the prescreen array is in the range of 0.010" down to 0.001", with highest performance achieved at the lower pitches such as 0.003" or less.

Conventional prior art screens have been well developed for substantially coarser pixel densities such as projection television, for example 480 lines over several feet, or a few tens of pixels per inch. As such, the prior art is concentrated on structures which are viable for these coarser applications, but not high resolution applications which are more likely to justify the use of tiling and related techniques involving multiple projectors to form a single image.

Figure 5:
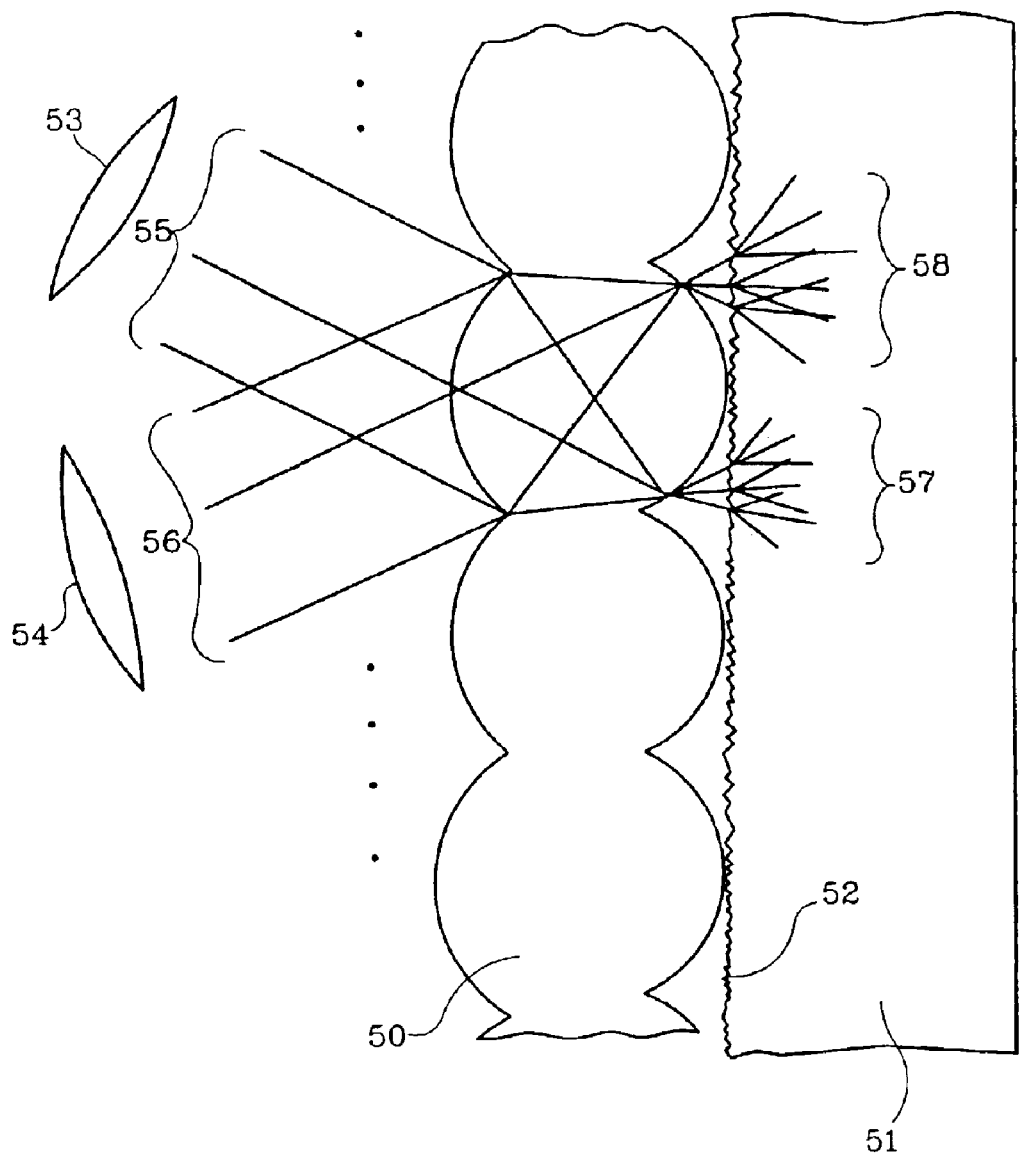
FIG. 5 is an enlarged cross-sectional side view of the illustrative screen assembly of FIG. 4A, shown interacting with two spaced light sources.

FIG. 5 is an enlarged cross-sectional side view of the illustrative screen assembly of FIG. 4A, with two spaced light sources. In this embodiment, the prescreen 50 acts to solve the angle of view sensitivity in a tiled display. Light rays 55 and 56 from to two separate projectors 53 and 54 are incident on prescreen 50. In the same manner as above, the light rays are converted in angle to be centered on the normal of the screen 51 prior to reaching the diffusing layer 52. The light rays 57 and 58 then exit through the screen 51 with an orientation that is independent of the projector locations. FIG. 5 clearly shows that while the light from the two projectors reaches the prescreen 50 in the same physical location, the two resulting spots on the screen are slightly offset from each other. This is further evidence that the pitch of the prescreen 50 should be kept small. The ability to use a simple homogeneous structure such as a prescreen 50, independent of position, is important to minimize the angle-sensitive seams in a tiled display.

It is additionally possible to extrapolate from the two projector scenario shown in FIG. 5 to a highly-tiled system involving many projectors in a two-dimensional regular or irregular matrix arrangement. A high degree of overlap can also be supported, including fully redundant projector arrays, where each pixel is potentially displayed by multiple projectors. This can be of considerable benefit in mission-critical applications such as avionics and control systems.

Figure 6:
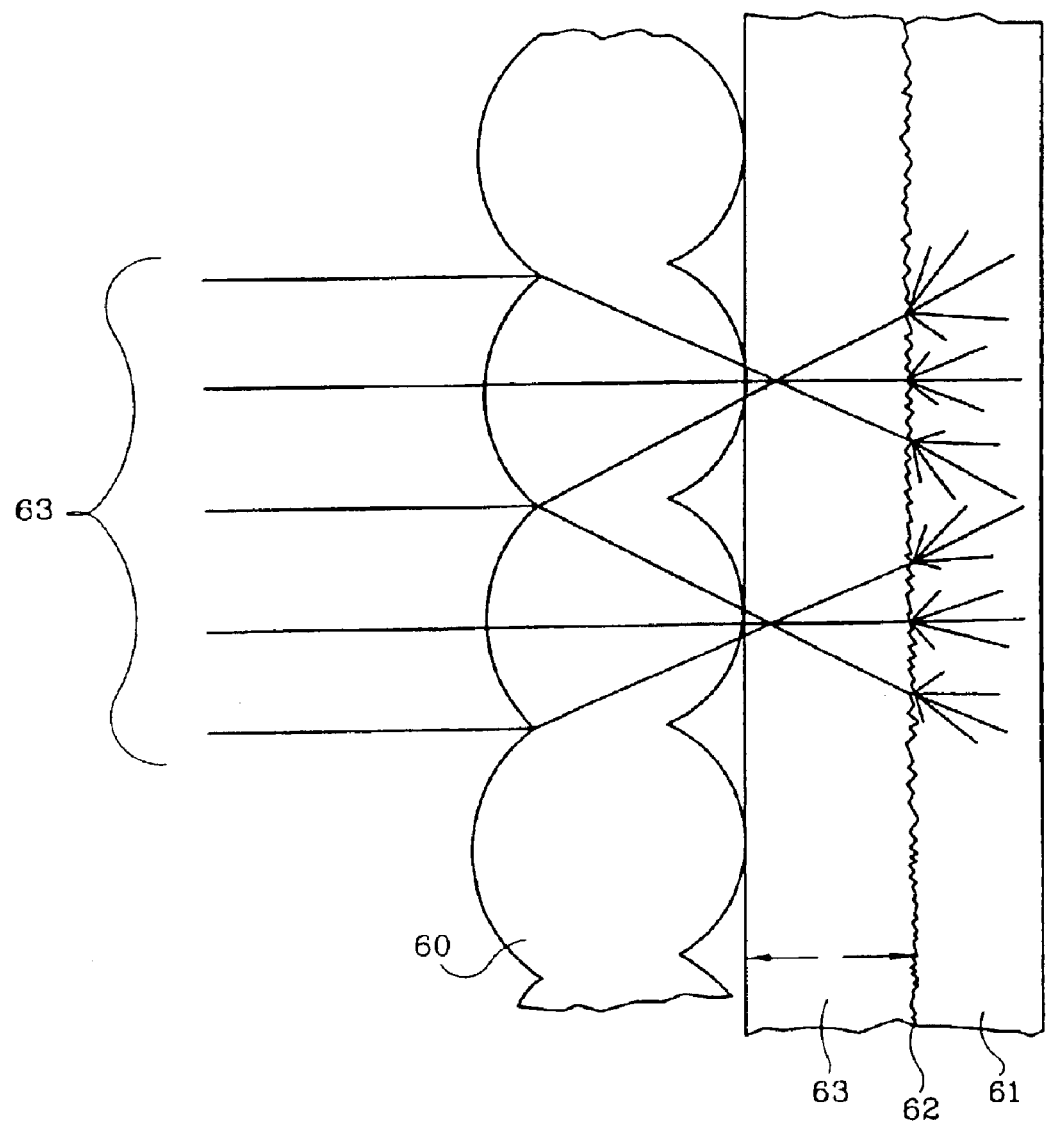
FIG. 6 is an enlarged cross-sectional side view of another illustrative screen assembly. with a gap between the lenticular array and the diffusion layer.

FIG. 6 is an enlarged cross-sectional side view of another illustrative screen assembly. with a gap between the lenticular array and the diffusion layer. While it is often desirable to preserve as much resolution on the diffusing structure 62 of screen 61, there may be applications when some additional blurring or defocus of the image is desirable, especially when it can be easily done in a way which is uniform and consistent across the entire displayed surface. This may be achieved by the addition of a spacer layer 63 between the prescreen 60 and the diffusing structure 62. The net effect is a form of depixelization, where individual pixel substructure or other substructure due to the individual lenslets or the like can be substantially suppressed from the final image. Spacer layer 63 can take the form of a transparent or translucent layer such as plastic or glass, or may be an air gap of a controlled thickness. The thickness "d" of the spacer layer 63 can range from zero, for no depixelization, up to a thickness on the order of the pixel pitch or minimum feature size of the image, or even higher depending upon the degree of depixelization desired. One scenario where depixelization may be advantageous is if the range of viewing distances includes close up viewing where the pixel or lenslet substructure may be otherwise distracting to the viewer. Another scenario is in the case of a reduced speckle projection screen for the minimization of coherence effects in systems utilizing lasers, narrow band sources and highly directional light sources.

Figure 7:
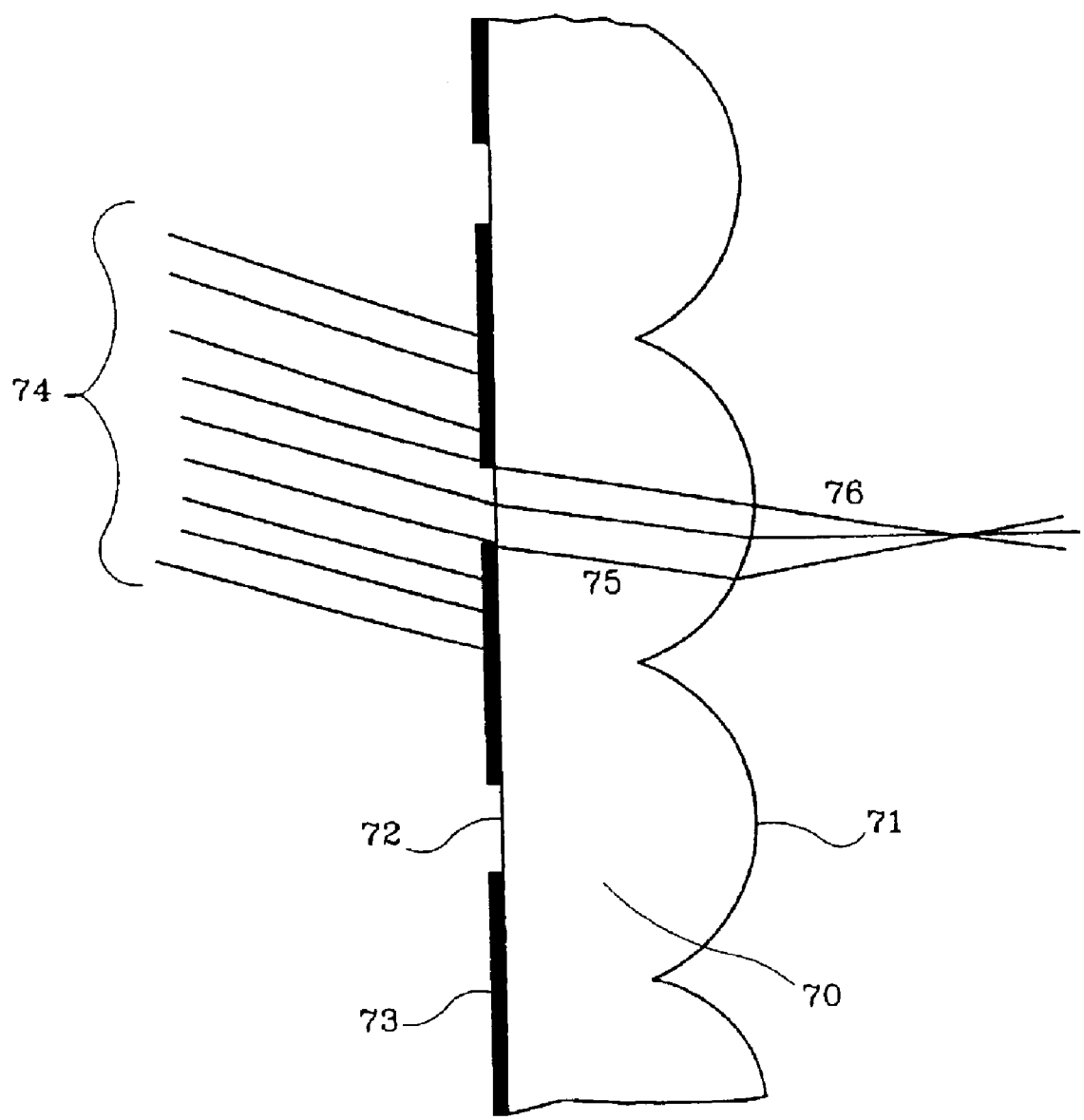
FIG. 7 is an enlarged cross-sectional side view of a single sided lenticular array with a number of apertures in registration with the lenslets.

FIG. 7 is an enlarged cross-sectional side view of a single sided lenticular array with a number of apertures in registration with the lenslets. In this embodiment, prescreen 70 has a lenticular surface 71 to redirect the light incident on the back of the prescreen 70. Here, however, an aperture mask is used to help minimize any light that might spill over into adjacent lenslets. A light blocking layer 73 is formed on or adjacent to the rear of the single sided lenticular array, as shown. Light transmitting apertures 72 are then provided opposite and registered with each lenticular lenslet, preferably at the focal or Fourier plane of the lenslet. Light transmitted within a maximum acceptance angle reaches the corresponding lenticular surface, which effectively collimates the image of the aperture stop.

For a given set of light rays 74 from a projector, only a subset of those rays 75 will pass through the aperture. Since the prescreen optical design is preferably telecentric, the exiting rays 76 will be centered orientationally about the normal to the lens axis. Incidence angle variation, such as from various projector locations, may thus only influence the spatial position of the light, and only by a fraction of the lenticular pitch. While the rear surface in aperture 72 is shown flat, it may also be lenticular in nature, if desired. Additionally, the size and locations of the apertures can be varied spatially if desired, such as to define a preferred viewing box.

Figure 8:
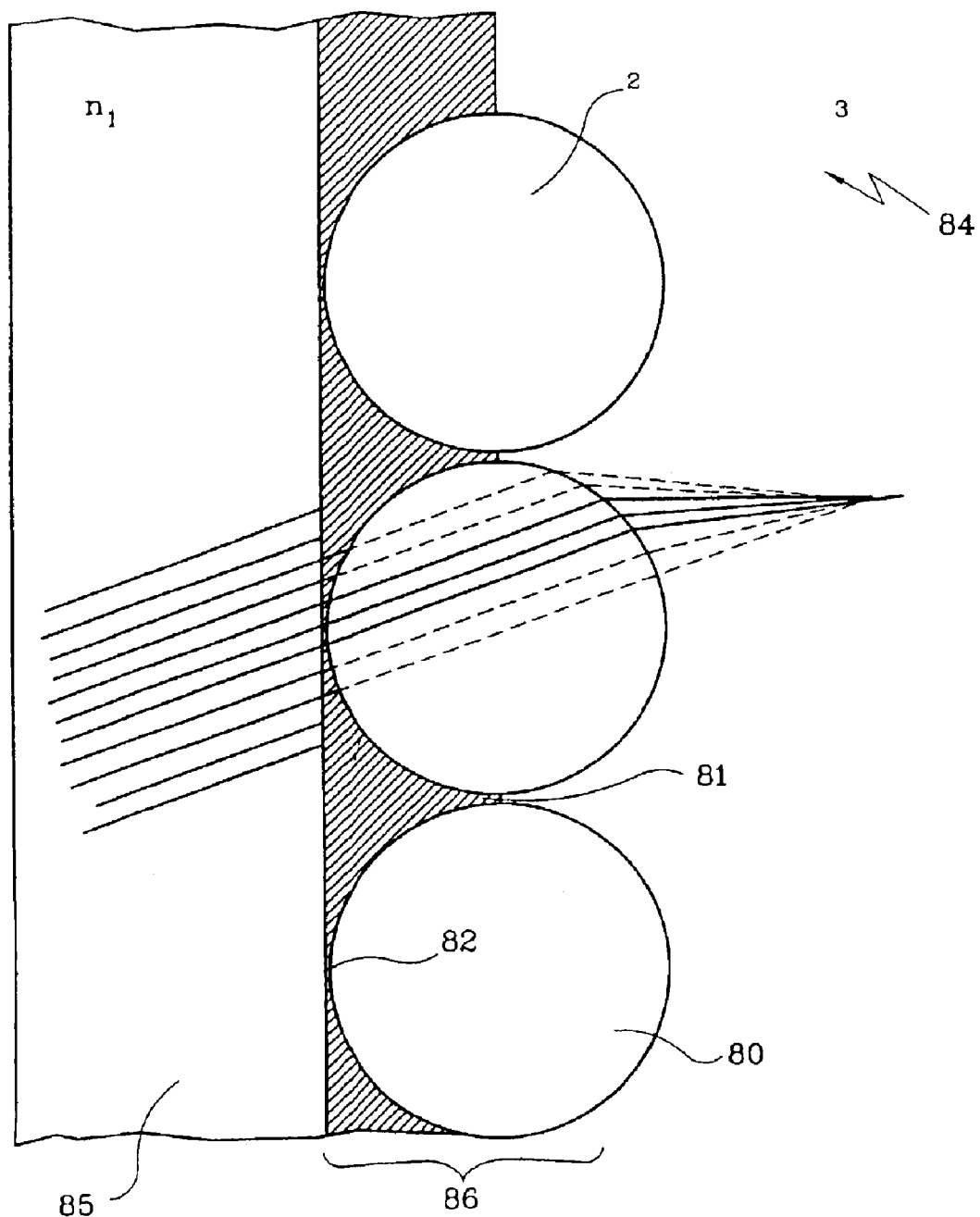
FIG. 8 is an enlarged cross-sectional side view of another lenticular array structure that has a number of apertures in registration with the lenslets.

FIG. 8 is an enlarged cross-sectional side view of another lenticular array structure that has a number of apertures in registration with the lenslets. The lenticular surface is formed by a collection of light transmitting and refracting elements, preferably spheres 80 partially embedded in a light blocking layer 81. Toward the back of the spheres 80 are effective apertures 82 where the light blocking layer 81 is absent or at least thinner than in other regions toward the side of the spheres. Thus, an analogous aperture and lens structure is formed which is functionally similar to that shown in FIG. 7. The film 86, including light blocking layer 81 and spheres 80 with a refractive index "n2" is preferably supported by a substrate 85 having refractive index "n1". On the other side of the spheres is preferably a matrix material 84 having a refractive index "n3", preferably air. If sufficient physical integrity is provided in film 86, support substrate 85 may not be necessary.

The lenticular array structure of FIG. 8 is similar to a commercially available screen available from Jenmar Visual Systems, which is described in U.S. Pat. No. 5,563,738. The Jenmar screen uses the light blocking layer 81 as an ambient light rejection mask. The projected image enters the spheres 80 from the right, and exits the spheres 80 through the effective apertures 82. The light blocking layer 81 is used to block most of the ambient light on the viewing side (left side) of the screen from entering the spheres 80. This increases the visual contrast of the screen.

Unlike the prior art, the present invention uses the lenticular array structure of FIG. 8 as a prescreen, preferably in conjunction with a diffusion screen. In a preferred embodiment the lenticular array structure of FIG. 8 is incorporated into a projection display system in a reversed orientation relative to the Jenmar screen. Accordingly, the projected image preferably enters spheres 80 through the effective apertures 82, and exits the spheres 80 to the right. Since the prescreen optical design is preferably telecentric, the exiting rays may be centered orientationally about the normal to the lens axis. Incidence angle variation, such as from various projector locations, may thus only influence the spatial position of the light, and only by a fraction of the lenticular pitch, as described above.

Figure 9A:
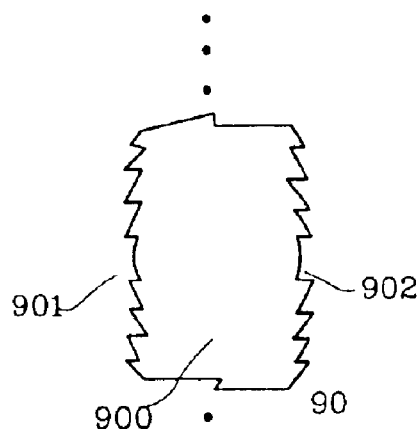
FIG. 9A is an enlarged cross-sectional side view of a dual sided Fresnel lenslet.
Figure 9B:
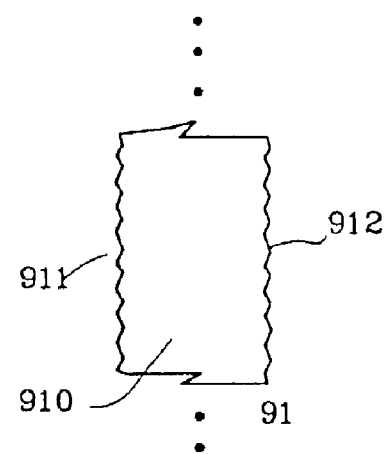
FIG. 9B is an enlarged cross-sectional side view of a dual sided diffractive lenslet.
Figure 9C:
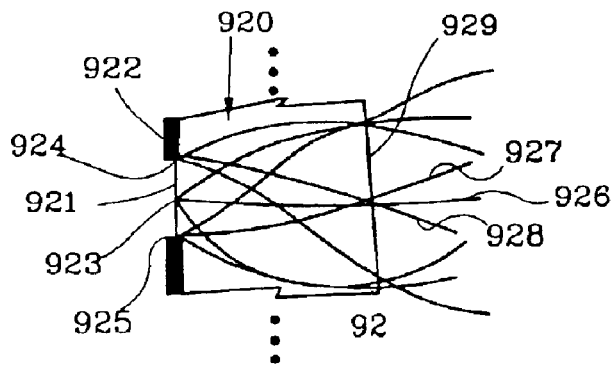
FIG. 9C is an enlarged cross-sectional side view of a Gradient Refractive Index (GRIN) Lenslet.

FIGS. 9A–9G are enlarged cross-sectional side views of a number of lenslet structures. Dual refractive Fresnel lenticular element 90 of FIG. 9A functions similar to previous embodiments but utilizes an array of lens elements, one of which is shown, having a Fresnel lens surface profile. Diffractive prescreen 91 of FIG. 9B is again similar except that surfaces of diffractive lenses 911 and 912 are positioned on substrate 910 in each lens element in the array. In FIG. 9C, gradient refractive index lens (GRIN) array 92 may include an array of lenslets 920 having a radial gradient in the refractive index such that light incident on the rear side 921 is collimated by the lens element and exits on the front side 929 prior to reaching a screen. In this case, the screen may optionally be bonded or deposited with little adverse consequence since the surface 929 is flat. Light blocking layer 922 may optionally be applied to enhance the maximum acceptance angle, as described above. The incident rays 923 then exit the lens as normal rays parallel to ray 926, incident rays 924 exit the lens parallel to ray 928, and incident rays 925 exit the lens parallel to 927.

Figure 9D:
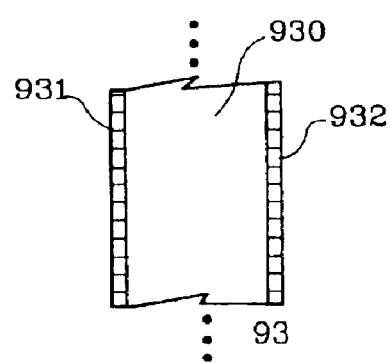
FIG. 9D is an enlarged cross-sectional side view of a dual sided holographic lenslet.

FIG. 9D is an enlarged cross-sectional side view of a dual sided holographic lenslet. Holographic prescreen 93 includes an array of elements 930, each having volume holographic lens layers on each side. As a variation, a simple GRIN lens layer can be used on each surface, provided sufficient optical power can be achieved.

Figure 9E:
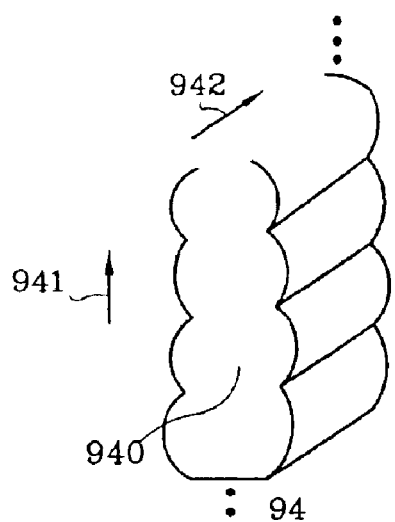
FIG. 9E is an enlarged cross-sectional side view of a dual sided cylindrical lens array.

Cylindrical lens array 94 of FIG. 9E is similar to previous embodiments except that cylindrical rather than spherical or aspheric lenses are used. That is, there is a lenticular surface profiling along a first direction 941 but not along a second, orthogonal direction 942. To accomplish angle insensitivity along both directions, two such elements may optionally be used together, with one rotated approximately 90 degrees from the first, to form a composite prescreen structure.

Figure 9F:
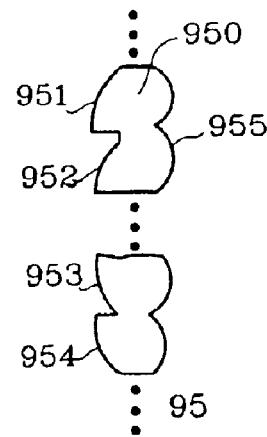
FIG. 9F is an enlarged cross-sectional side view of a gradient profile lens array.
Figure 9G:
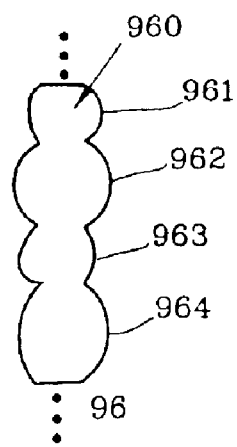
FIG. 9G is an enlarged cross-sectional side view of a lenticular lens array with random size lenslets.

FIG. 9F is an enlarged cross-sectional side view of a gradient profile lens array. Gradient profile lens array 95 shows how the lenticular profile or sag can be modified as a function of position on the prescreen. While this may complicate the structure, it can greatly increase the local acceptance angle by matching the profile to the direction from which the light is coming. In the example shown, lenses 955 are all similarly shaped whereas lenses 951 through 954 vary from each other in some way. While the variation can be gradual across the prescreen, it does not necessarily need to be, and could be stepped in sections as long as each section supports the appropriate range of acceptance angles. Yet another variation is seen in FIG. 9G, where individual lenslets 961 through 964 have a somewhat random size, shape or other characteristics. This approach tends to reduce the likelihood that Moire or other artifacts are visible.

While each of these and previous embodiments are shown separately, it is contemplated that many of the embodiments may be used in combination in hybrid type configurations.

Figure 10:
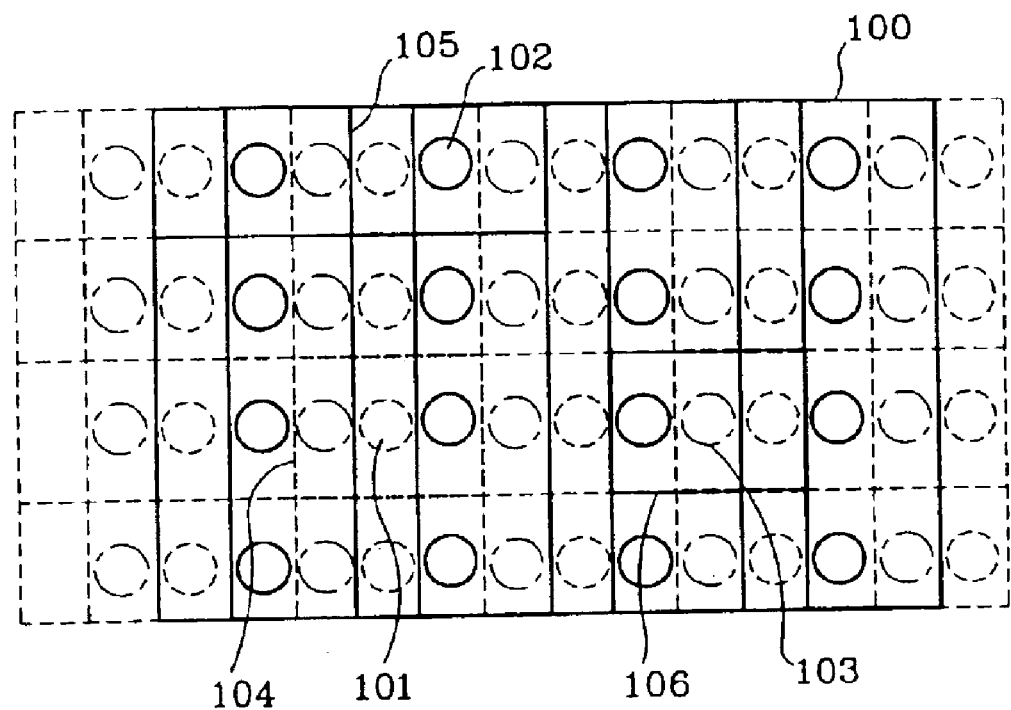
FIG. 10 is a schematic diagram of a tiled projection display showing illustrative projector locations.

FIG. 10 is a schematic diagram of a tiled projection display showing illustrative projector locations. The projection display screen area 100 is filled by the projected images of 56 monochrome projectors. For example, a red, a green and a blue projector, 101, 102, and 103, respectively, each project images onto the screen in corresponding regions 104, 105 and 106. Other projectors project images into other regions of the screen in a similar manner. The projectors of each color form a tiled system, which fill the total area 100. This leads to a rather simple, compact and readily scalable approach which has the potential for very high efficiency and high resolution. Assuming, for example, that the embodiment shown in FIG. 10 uses monochrome 1024×768 light valve projectors the overall useful display area would provide more than 12 million full color pixels. Clearly, other arrangements, color schemes and degrees of overlap can be used.

Figure 11A:
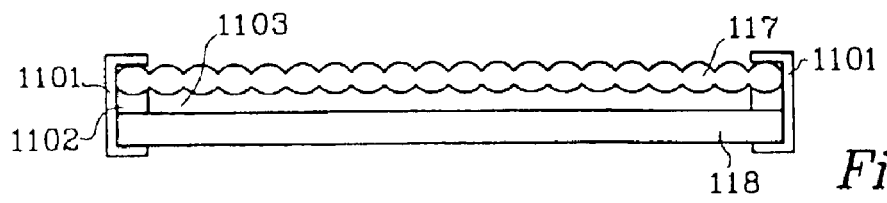
FIG. 11A is a partial cross-sectional side view of an illustrative screen assembly of the present invention with an edge clamping assembly clamping the prescreen to the screen.

As mentioned previously, maintaining uniform proximity of the prescreen to the screen may be important for the present invention. FIGS. 11A–11I show several embodiments for maintaining the proximity of the prescreen relative to the screen. In FIG. 11A, the prescreen 117 is held in close and uniform proximity to screen 118 by tension maintaining edge clamping assembly 1101, which is placed around the perimeter of the screen assembly formed by the prescreen and screen. Optional edge spacers 1102 may be included between the prescreen and screen when a gap 1103 is desired.

Figure 11B:
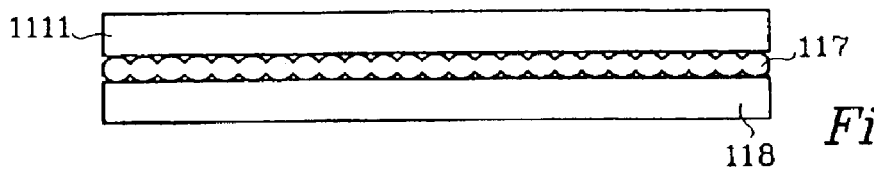
FIG. 11B is a partial cross-sectional side view of another illustrative screen assembly of the present invention with the lenticular prescreen sandwiched between a substrate and the diffusion screen.
Figure 11C:
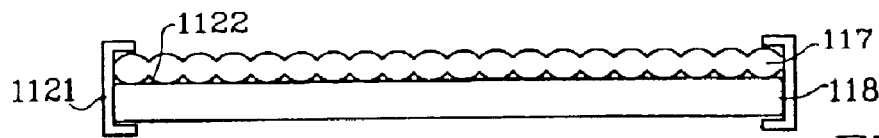
FIG. 11C is a partial cross-sectional side view of yet another illustrative screen assembly of the present invention with the lenticular prescreen secured to the diffusion screen using a sealing mechanism.

In FIG. 11B, an additional substrate 1111 is provided to hold the prescreen 117 in close proximity to the screen 118 by sandwiching the prescreen therebetween. In FIG. 11C, the prescreen 117 is held in place by providing a sealing layer 1121 around the edges of the prescreen 117 and screen 118. Then a negative pressure is applied to the intervening region 1122 between prescreen 117 and screen 118. The negative pressure holds the prescreen 117 in close proximity to the screen 118. If desired or necessary, an additional low pressure reservoir can be provided along with optional active element for maintaining or regaining the negative pressure condition.

Figure 11D:
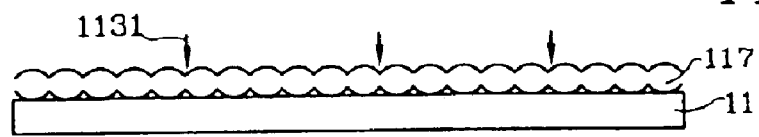
FIG. 11D is a partial cross-sectional side view of another illustrative screen assembly of the present invention with the lenticular prescreen secured to the diffusion screen using a positive air pressure in the region directly behind the prescreen.
Figure 11E:
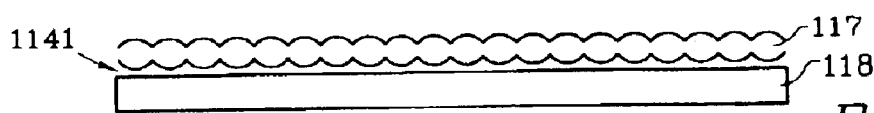
FIG. 11E is a partial cross-sectional side view of another illustrative screen assembly of the present invention with the lenticular prescreen secured to the diffusion screen using an electrostatic force.

Positive pressure method 113 is shown in FIG. 11D. In this embodiment, positive pressure 1131 is provided in the region directly behind the prescreen 117. This holds the prescreen 117 in contact with the screen 118. The positive pressure can be provided by, for example, a fan or sealed chamber which is heated (e.g., by the projection light sources). In FIG. 11E, an electrostatic force 1141 is used to hold the prescreen 117 in close proximity to the screen 118. The electrostatic force 1141 may be provided by an electrostatic coating or other material property.

Figure 11F:
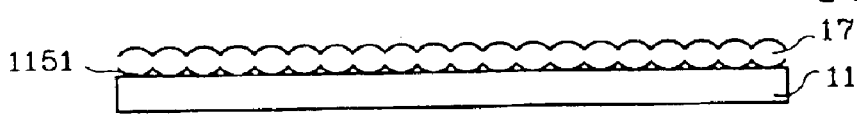
FIG. 11F is a partial cross-sectional side view of another illustrative screen assembly of the present invention with the lenticular prescreen spot bonded to the diffusion screen at predetermined bonding locations.

In FIG. 11F, the prescreen 117 is spot bonded to the screen 118 at predetermined bonding locations. Spot bonding uses small unobtrusive securing bonds 1151 to bond prescreen 117 to screen 118. The bonding spots 1151 may be regularly or irregularly spaced over the area of the prescreen 117, and preferably occupy only a very small percentage of the total area of the screen 118. Preferably, the spots 1151 are small compared to the image details, and preferably small compared to the lens pitch. The remaining regions may retain the air gap, which is desirable in many applications.

The bonding spots 1151 are preferably adhesive bonds formed using, for example a pressure sensitive adhesive, UV curable adhesive or epoxy. The adhesive may be transparent, opaque or light scattering, and may be applied by any of a variety of methods including spraying in liquid or powder form or by screen printing. Alternatively, the prescreen itself may be directly heat bonded to the screen in those spots if the prescreen is constructed of a suitable material.

Figure 11G:
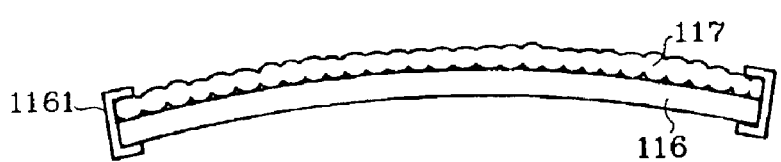
FIG. 11G is a partial cross-sectional side view of yet another illustrative screen assembly of the present invention with the lenticular prescreen drawn across a curved screen and held in place under tension by a clamping assembly.

In FIG. 11G the prescreen 117 is drawn across a curved screen 118 and held in place under tension by a clamping assembly 1161. The curvature of the screen 118 may be over one or two axis. In the case of a two axis curvature, such as a spherical shape, it may be beneficial to utilize a prescreen material that is capable of being stretched to some extent. If the stretching is not severe, the optical properties of the prescreen may only be nominally affected, and the resulting imaging performance may still be satisfactory.

Figure 11H:
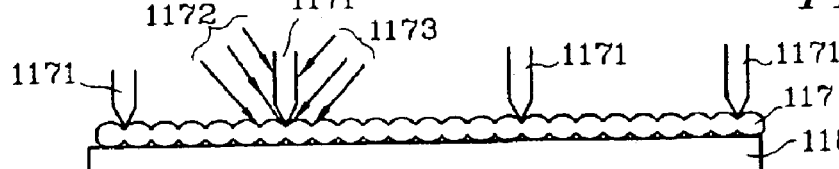
FIG. 11H is a partial cross-sectional side view of another illustrative screen assembly of the present invention with the lenticular prescreen held against the diffusion screen by light obscuring baffles.

FIG. 11H shows a proximity control method and apparatus particularly suited for use in tiled displays. Light blocking baffles 1171 apply pressure to prescreen 117, holding it in contact with screen 118. Baffles 1171 serve an additional purpose in that they defining the boundaries between adjacent projection tiles. For example, light rays 1172 and 1173, from two separate projectors, not shown, are incident on prescreen 117 and baffle 1171. In the case of the baffle 1171 being opaque, each portion of the prescreen in the vicinity of the baffle receives light from rays 1172 or rays 1173 but not both, thus clearly defining a self-aligned seam between tiles. If overlap is desired. semitransparent baffles or gradient transmission baffles can be used.

Figure 11I:
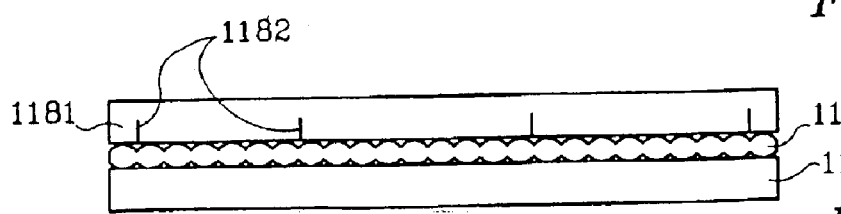
FIG. 11I is yet another illustrative screen assembly of the present invention with a substrate containing integral light baffles.

Finally, in FIG. 11I, baffles 1182 are embedded into a substrate 1181. Prescreen 117 is sandwiched between substrate 1181 and screen 118. The assembly is held together by clamping means, not shown. Operation of the baffles is similar to that described in the context of FIG. 11H.

Figure 12:
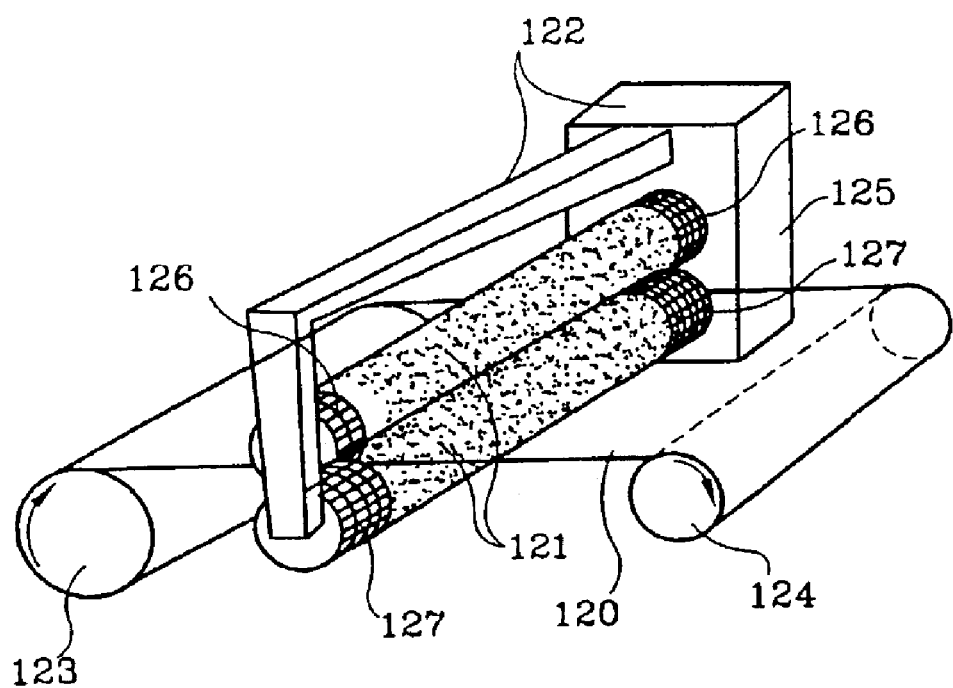
FIG. 12 is a partial perspective side view of an illustrative roller apparatus for forming two-sided lenticular films.

As indicated above, a thin prescreen element having a small lenticular pitch is desirable for a high resolution prescreen. FIG. 12 is a partial perspective side view of an illustrative roller apparatus for forming such a prescreen, and in particular, a two-sided registered lenticular film. Deformable plastic film 120 is passed between precision machined rollers 121 under a suitable combination of temperature and pressure to cause the plastic film 120 to deform, forming a two-sided lenticular film. Source roll 123 and take-up roll 124 contain the unpatterned and patterned film respectively. Rollers 121 are held in place and properly compressed by support structure 122. Even pressure is achieved through the use of crowned rollers or other methods well known in the art. Precision motion drive is effected by drive assembly 125, for example a precision servo motor system.

Registration of the two rollers 121 is accomplished by precision registration mechanism 126 and 127. In the example shown, 126 and 127 include precision machined interlocking features on the ends of the rollers 121. These are designed to mesh together in a system much like a kinematic mount, thereby maintaining precise relative alignment while the rollers are in a specific position. By providing a significant number of well distributed feature pairs, close tolerance can be maintained throughout the entire rotation cycle as well as along the axis of the rollers.

Thermal uniformity is provided to prevent relative expansion of the two rollers along their long axis. To maintain the thermal uniformity of the rollers, an air or liquid filled isothermal chamber may be placed around the system. Alternatively, a thermal adjustment mechanism may be distributed throughout the rollers. The thermal adjustment mechanism may include, for example, a circulating liquid or electrically adjusted heaters inside the rollers. While a source roll of film is shown, the source could also be a film extrusion or casting system. Several variations on the precision registration mechanism are also envisioned.

Figure 13:
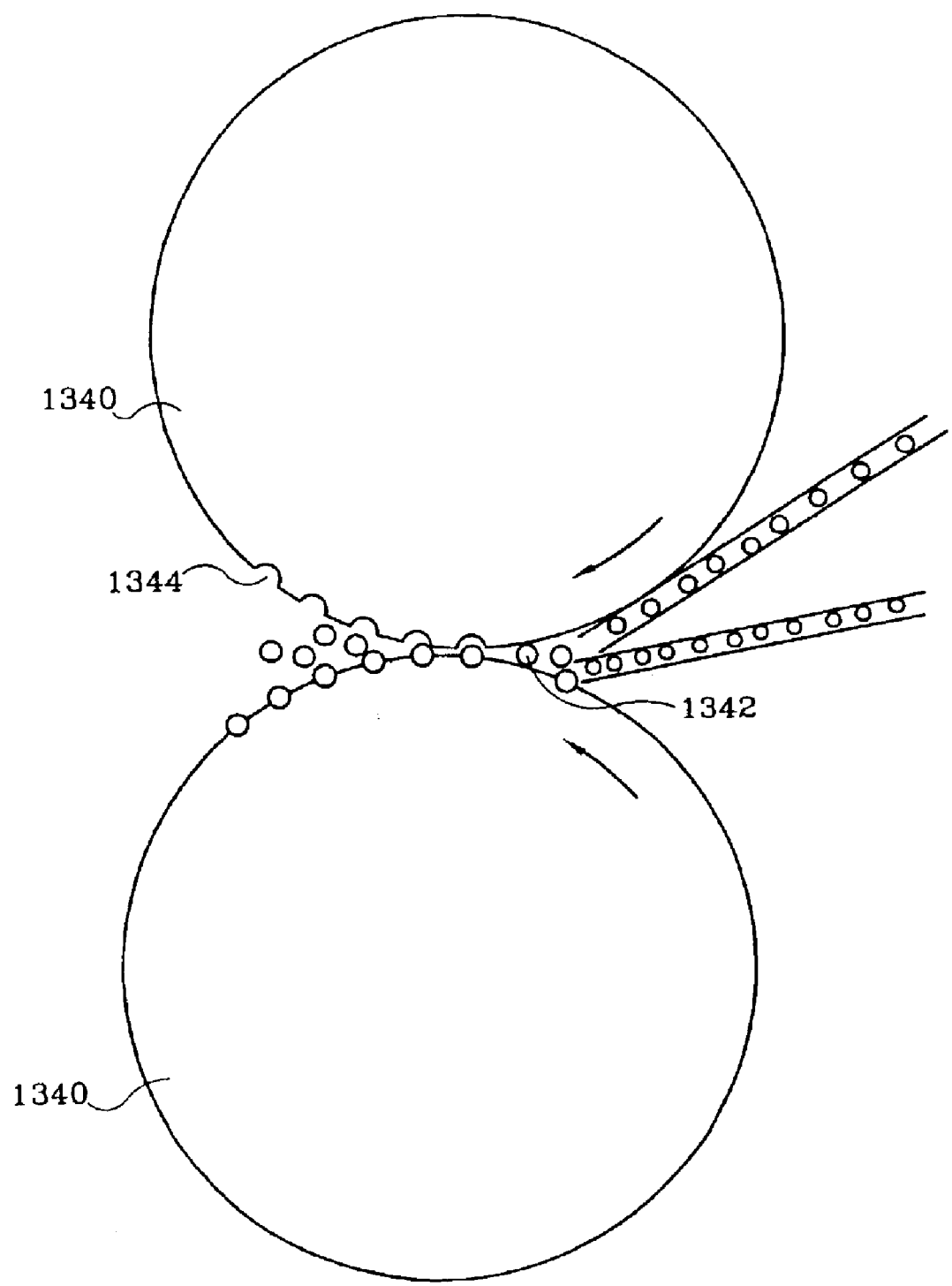
FIG. 13 is a partial perspective view of another illustrative roller apparatus in accordance with the present invention.

The rollers can be made in several ways. One approach is to precision machine each roller. This approach allows many of the parameters of the prescreen to be controlled. The cost of rollers, however will typically be significant. Another approach that can reduce the cost of the making the rollers uses a self aligning approach. FIG. 13 shows a partial perspective view of another illustrative roller manufacturing process. The rollers 1340 are first coated with a soft, curable material. Hard beads 1342 of the right size are then fed between the rollers 1340 as they are turned one complete revolution. The beads 1342 will form dimples 1344 on both the top and bottom roller 1340 that are self aligned. When the beads 1342 are removed and the rollers 1340 are cured, the dimples 1344 will emboss the desired lens pattern. An additional advantage of this approach is that the lens pattern can be randomized. Besides forming a pattern on the rollers 1340, this approach could be used to form masters for casting sheets of prescreen.

Figure 14:
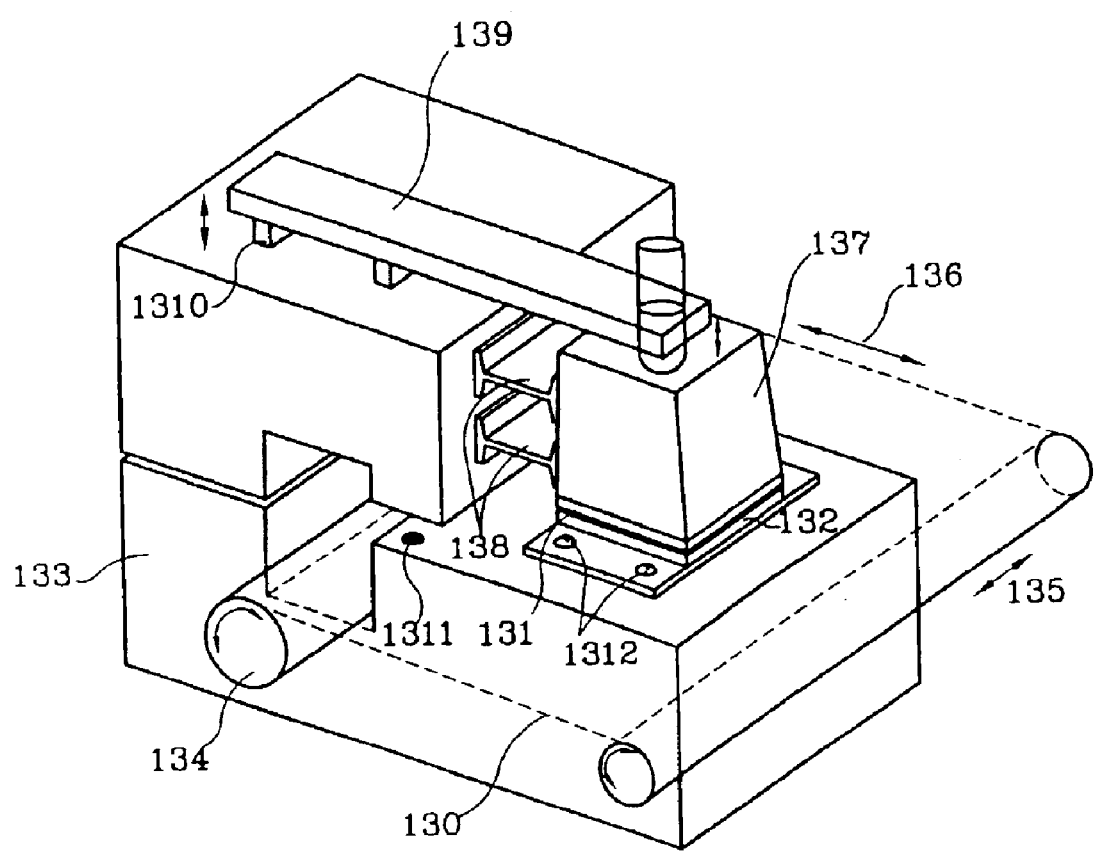
FIG. 14 is a partial perspective side view of an illustrative molding apparatus for forming arbitrary sized lenticular films.

FIG. 14 is a partial perspective side view of an illustrative molding apparatus for forming arbitrary sized lenticular films. This embodiment is effective for fabricating an arbitrary sized precision prescreen array in a step-and-repeat manner. Deformable plastic film 130 is passed between upper and lower precision compression molds 131 and 132. Each mold has the appropriate surface texture required to impart a registered dual-sided microlens array onto the film surface under suitable conditions of temperature and pressure.

Actuator 1310 is used, via lever arm 139, to bring the matching molds 131 and 132 together with the film 130 between them. Temperature control and feedback is incorporated into the mold supports or environment as needed. Once the lens array section defined by the molds is formed, the molds are separated by actuator 1310 and the film is translated along one or both of directions 135 and 136 by mechanical translation devices (not shown for purpose of clarity). As the film is pressed or embossed it is wound upon take-up reel 134.

Heavy duty support structure 133 provides a stable and non-flexing base for the moving parts. The dual flexure mounting arrangement 138 provides a stable and constrained single-axis motion of the upper mold 131 and its support block 137. Rotation about two axes is minimized by this approach, and rotation about the third axis is removed upon pressure against lower mold 132. Precision adjustment of the two molds is achieved by locking the lower mold in place using locking mechanism 1312, for example, while the upper mold 131 is pressed down while rigid spheres of the appropriate diameter are interposed between the two molds.

Finally, registration of each step-and-repeat section relative to its neighbors may be achieved by feedback from an optical encoding system 1311. Encoding system 1311 is in a sense self-aligning by incorporating previously formed microlenses into a position sensitive optical alignment system. In this manner, a fully scalable prescreen approach may be achieved with a minimum of precision hardware.

Numerous variations are readily envisioned. Alternate positioning systems or other components can be incorporated. Similarly, multiple sets of matched molds can be moved into or out of position, allowing position dependent prescreen performance. Flexure-based (or other type) translation stages can be used on both top and bottom to minimize risk of deforming the film outside of the desired compression area.

Figure 15A:
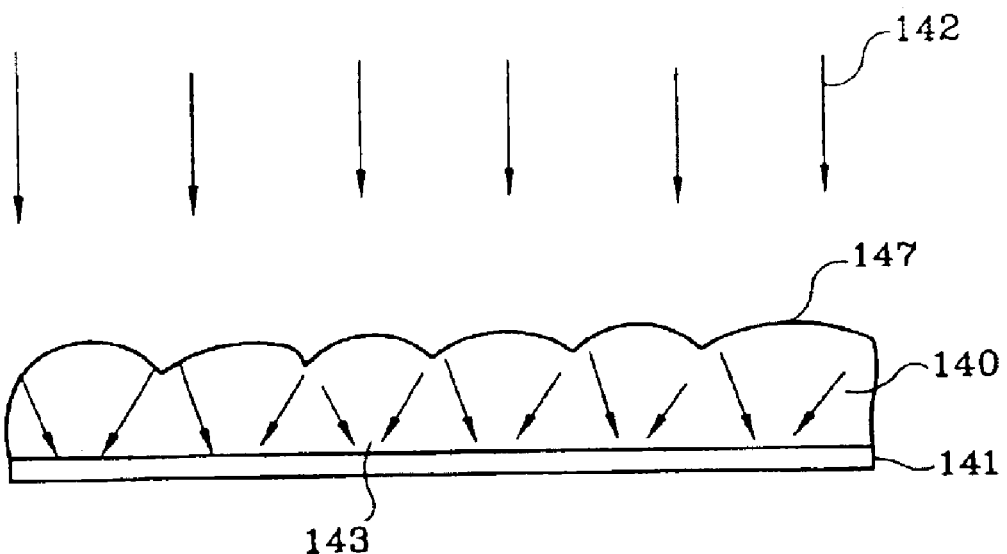
FIG. 15A is a partial cross-sectional side view of a substrate having an array of lenticular lenslets on one side and a photosensitive film on the other.
Figure 15B:
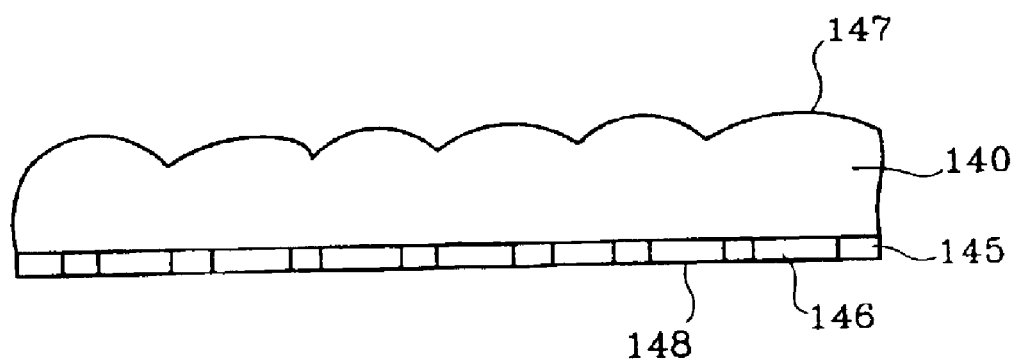
FIG. 15B is a partial cross-sectional side view of the substrate of FIG. 14A after light has been provided through the array of lenslets onto the photosensitive film, and the exposed portions of the photosensitive film have been selectively removed or otherwise processed.

Finally, FIGS. 15A–15B illustrate a method for forming a self-aligned aperture mask to a single sided lens array. A photosensitive layer 141, such as a photographic emulsion is coated onto a suitable microlens array film 140, on the side opposite the microlenses 147. Incident light 142 of a preselected angular distribution is used to expose the photosensitive layer 141 according to the focused pattern 143 generated by the lenticular structure in conjunction with light rays 142.

After development, the photosensitive layer 141 is transformed into an aperture mask 145 having clear areas 146 and light blocking areas 148, as shown in FIG. 14B. Various types of photosensitive processes can be used, including silver-halide emulsions, photoresist and photolithography processes and associated deposition steps. Further, it is contemplated that a separate support substrate may be used to form the aperture mask. Finally, it is contemplated that the same method may be used to form an aperture mask on a dual sided lens array.

The above-described methods and apparatus may be used to form a dual-sided flexible lenticular array film, wherein each lenslet is registered with a corresponding lenslet on the opposite side of the film. The pitch of the lenslets is preferably less than or equal to 10 mils for high resolution displays.

Numerous other possible variations on the described embodiments are readily envisioned. While specifically described in the context of a prescreen, the various structures and methods may be used to achieve scalable high resolution engineered diffusers of various types and suitable for various applications. Examples include angular homogenizers for uniform lighting such as in an LCD backlight, collimators for LCD backlights, retroreflective sheeting, intermediate screens in relayed optical systems tiled arrays of prescreen sections, very high gain screens and prescreens for front projection display screens.

Having thus described the preferred embodiments of the present invention, those of skill in the art will readily appreciate that the teachings found herein may be applied to yet other embodiments within the scope of the claims hereto attached.

What is claimed is:

1. A method for forming a screen, the method comprising the steps of:

forming an array of lenslets on a first side of a plastic film substrate;

coating a photosensitive material on a second side of the plastic film substrate;

projecting incident light to the first side of the plastic film substrate, the array of lenslets directing the incident light toward the photosensitive material;

developing the photosensitive material and removing selected portions of the photosensitive material to form a light incident side of a prescreen; and coupling a projection screen to the first side of the plastic film substrate.

2. A method according to claim 1, wherein the photosensitive material is a photo-resist.

3. A method according to claim 1, wherein the photosensitive material is a silver-halide emulsion.

4. A method according to claim 1, wherein the developing and removing step include a photolithography process.

5. A method according to claim 1, wherein the photosensitive material is provided by deposition directly on the second side of the plastic film substrate.

6. A method for forming a prescreen, the method comprising the steps of:

forming an array of lenslets on a first side and a second side of a first substrate, the pitch of the lenslets being 10 mils or less;

coating a photosensitive material on a second substrate;

positioning the first substrate and the second substrate adjacent to one another;

projecting incident light to at least a portion of the array of lenslets, the array of lenslets directing the light toward the photosensitive material on the second substrate; and developing the photosensitive material and removing selected portions of the photosensitive material to form a light incident side of the prescreen.

7. A method according to claim 6, wherein the photosensitive material is a photo-resist.

8. A method according to claim 6, wherein the photosensitive material is a silver-halide emulsion.

9. A method according to claim 6, wherein the developing and removing steps include a photolithography process.

* * * * *